Patented Feb. 16, 1954

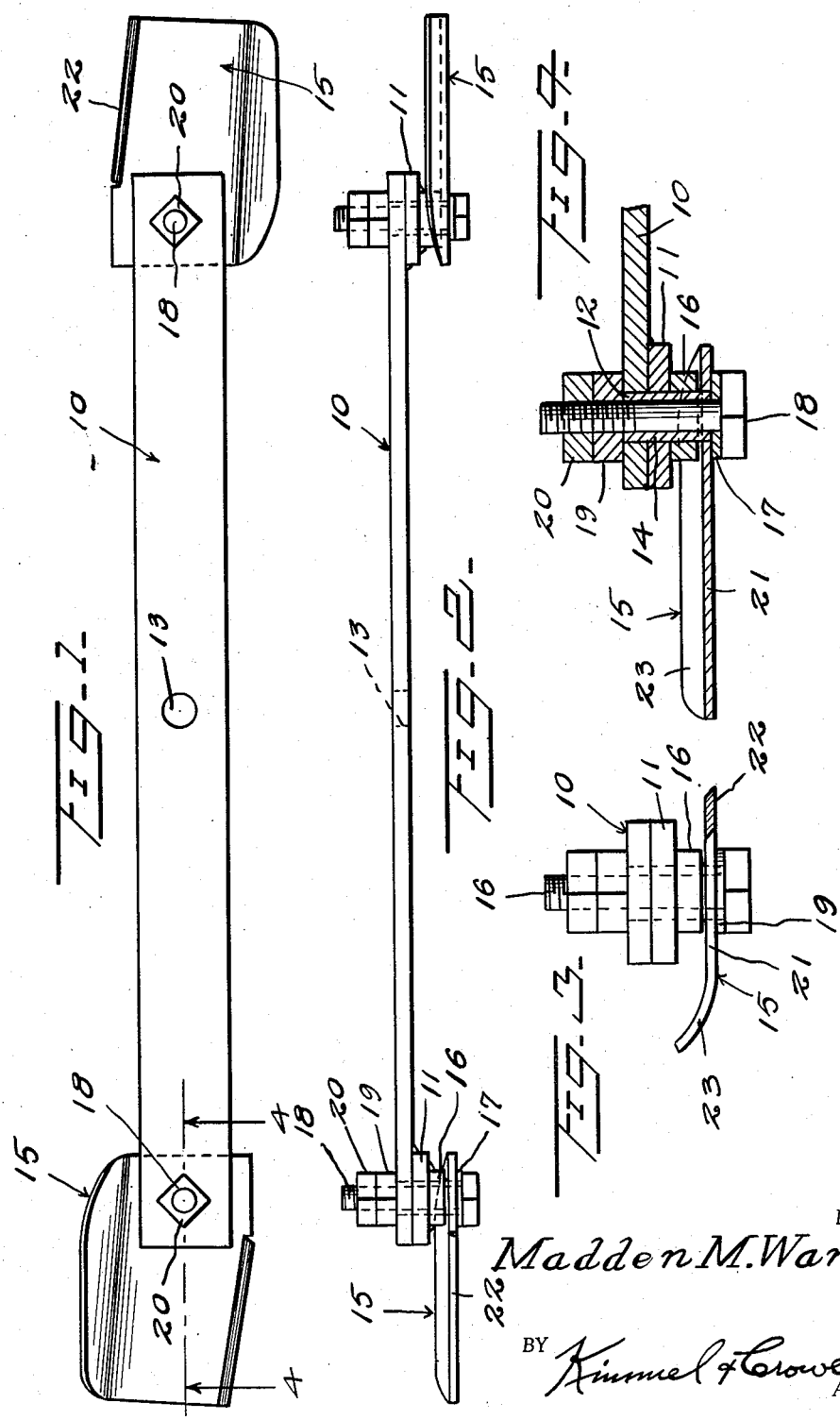

2,669,084

UNITED STATES PATENT OFFICE 2,669,084

ROTARY MOWER BLADE

Madden M. Warren, Atlanta, Ga., assignor of one-half to Guy M. Kirby, College Park, Ga.

Application June 18, 1952, Serial No. 294,130

1 Claim. (Cl. 56—295)

This invention relates to a cutting blade for a rotary lawnmower.

An object of this invention is to provide an improved cutting blade for a rotary lawnmower wherein a pair of cutting blades are pivotally mounted on a carrier, and are adapted to centrifugally swing outwardly to cutting position.

Another object of this invention is to provide an improved cutting blade for a rotary lawnmower which is so constructed and arranged that the cutting blades upon striking a hard object may pivot on the carrier, so that the power unit and the drive mechanism will not be damaged.

A further object of this invention is to provide a cutting blade assembly wherein the blades may be easily and quickly removed and replaced.

With the above and other objects in view, my invention consists in the arrangement, combination and details of construction disclosed in the drawing and specification, and then more particularly pointed out in the appended claim.

In the drawing:

Figure 1 is a plan view of a cutter assembly for use with a rotary lawnmower constructed according to an embodiment of this invention.

Figure 2 is a detailed side elevation of the device.

Figure 3 is an enlarged end elevation of the device.

Figure 4 is an enlarged fragmentary sectional view taken on the line 4—4 of Figure 1.

Referring to the drawing, the numeral 10 designates generally an elongated bar which constitutes a blade carrier and is provided with an opening 13 in the center thereof by means of which the carrier 10 may be secured to a vertically disposed drive shaft forming part of the mechanism for a rotary lawnmower. The bar or carrier 10 is provided at each end thereof and on the lower side with a block 11 which is welded or otherwise fixedly secured to the bar 10.

The bar 10 and block 11 have an opening 12 therethrough within which a cylindrical bushing 14 is mounted. The bushing 14 extends below the block 11 and a cutter generally designated as 15 is rotatably mounted about the lower end of bushing 14. A thrust washer 16 is disposed about bushing 14 between block 11 and the upper side of cutter 15, and a second thrust washer 17 is disposed below the cutter 15 and engages about the shank of a bolt 18.

The washer 17 bears against the lower end of bushing 14 and an upper nut 19 threaded on bolt 18 bears against the upper end of bushing 14. A lock nut 20 threaded on bolt 18 holds nut 19 in locked position on bolt 18. There is a slight space between the cutter 15 and the two washers 16 and 17 so that cutter 15 can freely rotate about bushing 14. Cutter 15 is formed of a flat plate 21 having a keen edge 22 and an upturned trailing edge 23. The upward curvature 23 of plate 21 provides a means whereby an upper draft of air will be created causing grass to stand erect and meet cutting edge 22 and also blow the grass upwardly.

In addition, the upward curvature of plate 21 will cause the cut grass to slide upwardly over the concave upper side of the trailing curved portion 23, which causes the grass to be struck more than once by the cutting edge 22, thereby resulting in the creation of a mulch.

In the use and operation of this blade assembly, the carrier 10 is firmly secured to the drive shaft of the mower with carrier 10 disposed in a horizontal position. As carrier 10 is rotated, cutting blades 15 will swing outwardly by centrifugal force to substantially the position shown in Figure 1.

In the event a relatively hard object is struck by one or more of the blades 15, these blades may swing inwardly under the impact of the blade with the object, so that the drive shaft and other mechanism associated therewith will not be subjected to the shock and will not be damaged thereby.

In view of the pivotal mounting of the cutting blades on the carrier and the simplicity of construction, these blades can be easily removed for sharpening, repair or replacement.

I do not mean to confine myself to the exact details of construction herein disclosed, but claim all variations falling within the purview of the appended claim.

What is claimed is:

A cutting blade construction for mounting on a vertical drive shaft of a rotary lawnmower, comprising an elongated carrier, bushing forming means at each end of said carrier, a cutting blade at each end of said carrier, means extending through said blades and bushings pivotally mounting said blades on said carrier, each blade being formed of a rectangular plate having a keen leading edge and an arcuately upturned parallel trailing edge, said upturned edge tapering downwardly to the level of the plate at the inner edge thereof.

MADDEN M. WARREN.

References Cited in the file of this patent

UNITED STATES PATENTS

| Number | Name | Date |
|---|---|---|
| 2,203,198 | Junge | June 4, 1940 |
| 2,592,755 | Soenksen | Apr. 15, 1952 |